(12) United States Patent
Esaki

(10) Patent No.: US 8,682,295 B2
(45) Date of Patent: Mar. 25, 2014

(54) PORTABLE ELECTRONIC APPARATUS DETECTING AN INCLINATION STATE

(75) Inventor: Michitada Esaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 242 days.

(21) Appl. No.: 13/130,956

(22) PCT Filed: Nov. 26, 2009

(86) PCT No.: PCT/JP2009/069980
§ 371 (c)(1),
(2), (4) Date: May 24, 2011

(87) PCT Pub. No.: WO2010/061900
PCT Pub. Date: Jun. 3, 2010

(65) Prior Publication Data
US 2011/0223888 A1    Sep. 15, 2011

(30) Foreign Application Priority Data
Nov. 26, 2008 (JP) ................... 2008-301735

(51) Int. Cl.
*H04W 12/06* (2009.01)
(52) U.S. Cl.
USPC ............ 455/411; 455/556.1; 455/575.3; 345/168; 345/166; 348/308
(58) Field of Classification Search
USPC ........... 455/411, 556.1, 575.3; 345/168, 166; 348/308
See application file for complete search history.

(56) References Cited

U.S. PATENT DOCUMENTS

| 7,003,142 | B1* | 2/2006 | Kruse | 382/124 |
| 2002/0012057 | A1* | 1/2002 | Kimura | 348/308 |
| 2002/0130841 | A1* | 9/2002 | Scott | 345/166 |
| 2003/0203747 | A1* | 10/2003 | Nagamine | 455/575.3 |
| 2004/0052407 | A1* | 3/2004 | Kawabe | 382/124 |
| 2006/0146027 | A1* | 7/2006 | Tracy et al. | 345/168 |
| 2006/0239517 | A1* | 10/2006 | Creasey et al. | 382/124 |
| 2008/0211778 | A1* | 9/2008 | Ording et al. | 345/173 |
| 2008/0240523 | A1* | 10/2008 | Benkley et al. | 382/126 |
| 2009/0203355 | A1* | 8/2009 | Clark | 455/411 |

FOREIGN PATENT DOCUMENTS

| EP | 1603313 A1 * | 12/2005 |
| JP | 2002-085383 A | 3/2002 |
| JP | 2004-038870 A | 2/2004 |
| JP | 2005-268951 A | 9/2005 |
| JP | 2007-025957 A | 2/2007 |

OTHER PUBLICATIONS

International Search Report; PCT/JP2009/069980; Jan. 12, 2010.

* cited by examiner

*Primary Examiner* — Mahendra Patel
(74) *Attorney, Agent, or Firm* — Studebaker & Brackett PC

(57) ABSTRACT

A mobile electronic device includes a fingerprint sensor for detecting an operation, an activation unit (control unit) for performing a predetermined action, an acceleration sensor for detecting an inclination state of the fingerprint sensor with respect to a horizontal plane, and a control unit for making the activation unit perform predetermined actions based on the operation detected by the fingerprint sensor. The control unit performs the detection in the fingerprint sensor differently according to the inclination detected by the acceleration sensor.

4 Claims, 14 Drawing Sheets

| SWEEP DIRECTION | SUCCESS RATE OF FINGERPRINT AUTHENTICATION | AUTHENTICATION METHOD | ALLOCATION EXAMPLE OF ACTIVATION APPLICATION |
|---|---|---|---|
| A | HIGH | GENERAL FINGERPRINT AUTHENTICATION (AUTHENTICATION LEVEL TO WHICH THE DEFAULT SETTING OF A FINGERPRINT SENSOR IS MADE) | GENERAL ACTIVATION [CAPABLE OF USING ALL FUNCTIONS OF TERMINAL] |
| C | | | ELECTRONIC CASH FUNCTION (ACTIVATION ONLY) |
| | | | DATA TRANSMITTING/RECEIVING BY INFRARED (PROFILE, ETC.) ONLY |
| B | LOW | A LOWER-LEVEL AUTHENTICATION DETECTION THAN A GENERAL AUTHENTICATION IS PERFORMED. AT THAT TIME, IT IS PREFERABLE TO ALLOCATE AN APPLICATION HAVING A LOW SECURITY LEVEL. (IN THE DETECTION BY PATTERN MATCHING OR EXTRACTING FEATURE POINTS, A DETERMINATION BY A PARTIAL AUTHENTICATION MATCH IS USED.) | DISPLAY OF DATE, ETC. USING SUB-DISPLAY UNIT (ACTIVATION ONLY) |
| | | | SILENT MODE (ACTIVATION OF SWITCHING, ETC. ONLY CORRESPONDING TO THE CURRENT SIDE KEY) |
| | | | ONE-SEG SERVICE (ACTIVATION ONLY) |
| D | | | CAMERA (ACTIVATION ONLY) |
| | | | INFRARED REMOTE CONTROLLER (ACTIVATION ONLY) |
| | | | RADIO (ACTIVATION ONLY) |
| | | | MUSIC SYSTEM (ACTIVATION ONLY) |

PORTABLE ELECTRONIC APPARATUS DETECTING AN INCLINATION STATE

TECHNICAL FIELD

The present invention relates to a mobile electronic device, such as a mobile phone, including an operation detection unit for detecting operations.

BACKGROUND ART

There has been known a mobile electronic device capable of locking or unlocking a particular function in a timing intended by a user based on an inclination angle of the device (see Patent Literature 1).

CITATION LIST

Patent Literature

Patent Literature 1: JP-A-2007-25957

SUMMARY OF THE INVENTION

Problems that the Invention is to Solve

However, the mobile electronic device disclosed in Patent Literature 1 may have difficulty in operating an operation detection unit if the mobile electronic device itself is inclined at a certain condition.

The present invention provides a mobile electronic device capable of suitably performing a predetermined action.

Means for Solving the Problems

A mobile electronic device according to the present invention comprises: an operation detection unit that detects an operation; an activation unit that performs a predetermined action; an inclination detection unit that detects an inclination state of the operation detection unit with respect to a horizontal plane; and a control unit that makes the activation unit perform the predetermined action according to the operation detected by the operation detection unit, wherein the control unit changes the detection in the operation detection unit according to the inclination detected by the inclination detection unit.

Preferably, the operation detection unit is configured to detect an operation by the movement of a subject to be detected, and the control unit is configured to make the operation detection unit change the operation detection direction by the movement of the subject to be detected according to the inclination detected by the inclination detection unit.

Preferably, the operation detection unit is configured to detect the operation and biometric information based on the operation by the movement of the subject to be detected.

Preferably, the mobile electronic device further comprises a storage unit that stores particular biometric information, wherein the operation detection unit is configured to detect the biometric information based on the operation, and wherein the control unit is configured to: make the activation unit perform predetermined actions based on the operation detected by the operation detection unit and a comparison between the biometric information detected based on the operation and the particular biometric information stored in the storage unit; and change the comparison method according to the inclination detected by the inclination detection unit.

Preferably, the storage unit stores personal information for identifying particular individuals, the activation unit performs a first application action using the personal information stored in the storage unit or a second application action not using the personal information stored in the storage unit as the predetermined action, and the control unit uses the comparison method differently to the first and second applications.

Advantage of the Invention

According to the present invention, the operation detection unit executes different detection process in accordance with an inclination state so that the present invention can suitably perform a predetermined action irrespective of the inclination state.

BRIEF DESCRIPTION OF THE DRAWINGS

FIG. 17 shows one example of an allocation of application regarding a shortcut activation function according to the embodiment of the present invention.

BEST MODE FOR CARRYING OUT THE INVENTION

Embodiments of the present invention will be described with reference to the drawings.

Figure 1:
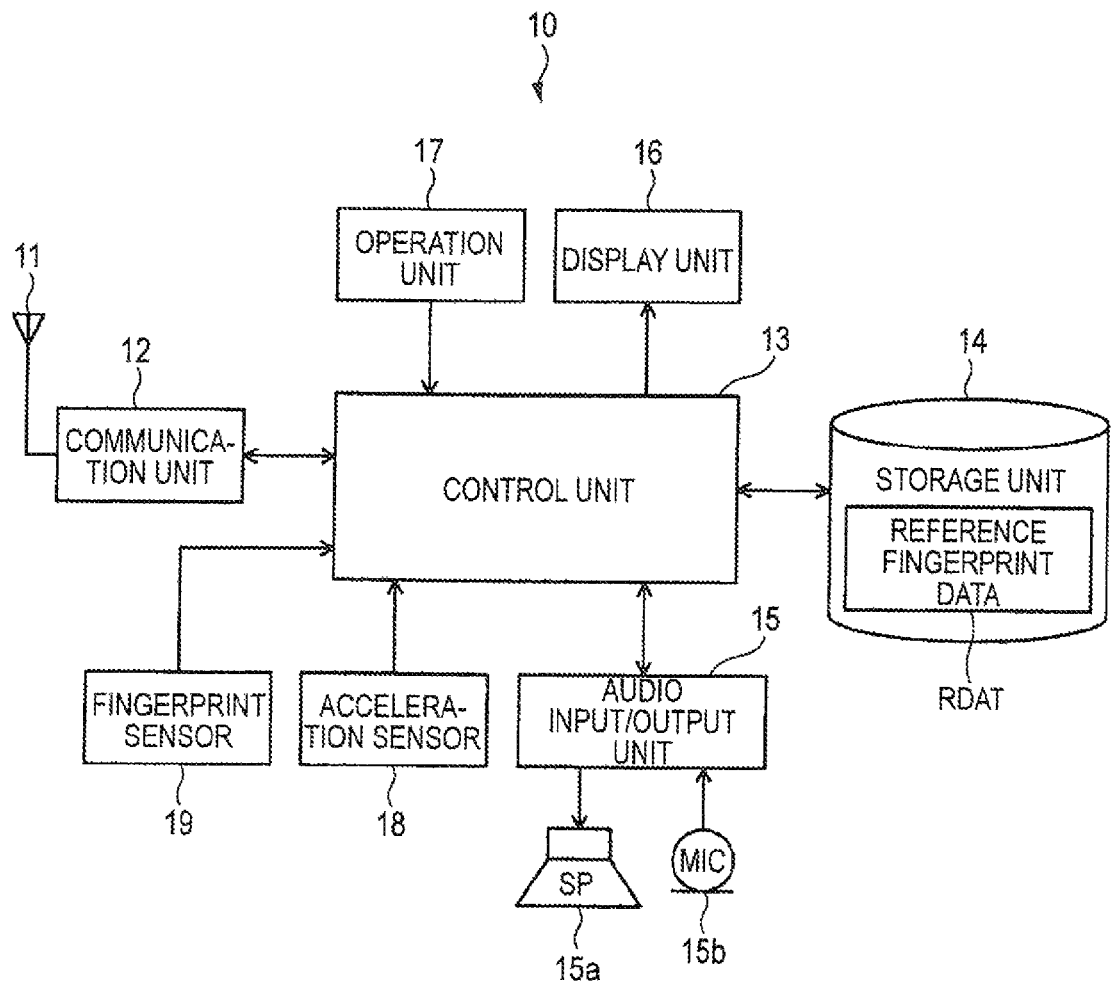
FIG. 1 is a schematic block diagram showing one example of a configuration of a mobile electronic device according to an embodiment of the present invention.

FIG. 1 is a schematic block diagram showing one example of a configuration of the mobile electronic device according to the embodiment of the present invention.

In FIG. 1, the mobile electronic device 10 includes an antenna 11, a communication unit 12, a control unit 13, a storage unit 14, an audio input/output unit 15, a speaker (SP) 15a, a microphone (MIC) 15b, a display unit 16, an operation unit 17, an acceleration sensor 18, and a fingerprint sensor 19.

Incidentally, the control unit 13 corresponds to an activation unit and a control unit in the present invention. The acceleration sensor 18 corresponds to an inclination detection unit in the present invention. The fingerprint sensor 19 corresponds to an operation detection unit in the present invention.

In this embodiment, the mobile electronic device 10 is a mobile phone. Incidentally, the mobile electronic device 10 may be, for example, a PHS (Personal Handy phone System). The mobile electronic device 10 has a voice call function.

The mobile electronic device 10 can operate various applications, including preparing and transmitting/receiving electronic mails and browsing WWW (World Wide Web) sites. The various applications also include an electronic cash function, an infrared transmitting/receiving function, a clock function, a silent mode function, a One-Seg service function, a camera function, a radio function, an infrared remote controller function, a music reproduction function, etc.

The electronic cash function enables one to pay at a retail shop, etc., for example, by a non-contact IC chip (not shown). The infrared transmitting/receiving function enables one to exchange personal data, such as telephone numbers, photograph data, etc., with another mobile electronic device, for example, by infrared communications based on the IrDA (Infrared Data Association) requirements. The clock function displays data, etc., for example, on the idle screen, etc. of the display unit 16.

The silent mode function mutes ringtone, for example. The One-Seg service function enables one to watch ground wave digital television broadcasting by ground wave digital television broadcasting 1 segment partial receiving service ("One-Seg").

The camera function enables one to shoot an object, for example, by an imaging element (not shown), such as CMOS (Complementary Metal-Oxide Semiconductor) or CCD (Charge Coupled Device). The radio function enables one to listen to radio broadcasting. The infrared remote controller function can turn on or off, for example, electronic appliances such as television, etc. The music reproduction function can reproduce music downloaded from an application server, etc. These applications are operated by the control unit 13.

The mobile electronic device 10 has a shortcut activation function capable of activating or operating a pre-allocated application by using a sweep operation performed at the time of a fingerprint authentication by the fingerprint sensor 19 as a trigger. Such sweep operation and shortcut function will be explained later.

In this embodiment, the antenna 11 is a built-in antenna. The antenna 11 may be, for example, a rod antenna. The antenna 11 transmits an electromagnetic wave at a predetermined frequency band to a base station (not shown) or receives the electromagnetic wave from a base station.

The communication unit 12 modulates a receiving signal outputted from the control unit 13 by a predetermined modulation scheme and transmits the modulated receiving signal to the base station as a radio signal through the antenna 11. Further, the communication unit 12 demodulates the radio signal received from the base station through the antenna 11 to correspond to the modulation scheme and outputs the demodulated signal to the control unit 13 as a receiving signal.

The control unit 13 is configured by, for example, a microcomputer, DSP, etc. The control unit 13 controls the entire actions of the mobile electronic device 10 based on the operation of the operation unit 17 so that the above-described various applications can be performed in an appropriate order.

The control unit 13 performs setting a security level regarding a desired function, locking and unlocking, fingerprint authentication, processing data inputted from the acceleration sensor 18, a voice call, and the operation of an application for an electronic mail or WWW browsing, etc.

Further, the control unit 13 controls communications in the communication unit 12, accesses to the storage unit 14, data display on the display unit 16, character input by the operation unit 17, audio processing in the audio input/output unit 15, and the fingerprint sensor 19.

The storage unit 14 is configured by, for example, a non-volatile storage device (flash memory) or a randomly accessible storage device (SRAM, DRAM), etc.

For example, reference fingerprint data RDAT, personal information for identifying individuals, etc, are stored (memorized) in the storage unit 14. The reference fingerprint data RDAT is user's fingerprint data and the user's fingerprint is pre-registered therein. Incidentally, the reference fingerprint data RDAT corresponds to a particular biometric data in the present invention. The personal data includes, for example, a password and a bank balance used for the electronic cash function, information regarding addresses, telephone numbers, etc.

Also, an operating system, an application program, output results of the control unit, temporary data used for program processing, etc. are stored in the storage unit 14.

In order to output digital audio data provided by the control unit 13 through the speaker 15a, the audio input/output unit 15 performs signal processing, such as digital/analog (D/A) conversion, amplification, etc. of the digital audio data.

In order to convert an analog audio signal inputted by the microphone 15b into a digital audio signal and to output it to the control unit, the audio input/output unit 15 performs signal processing, such as amplification, analog/digital (A/D) conversion, encoding, etc. of the analog audio data.

The display unit 16 is configured by a display device, for example, a liquid crystal display panel, an organic EL (Electro-Luminescence) panel, etc. The display unit 16 displays various types of information based on a video signal provided by the control unit 13.

The operation unit 17 includes a plurality of keys to which various functions are allocated, for example, a power key, a call receiving key, number keys, character keys, a direction key, a determination key, a call sending key, etc. When the user operates such keys, the operation unit 17 generates a signal corresponding to the operation and outputs the signal to the control unit 13 pursuant to the user's instructions.

Incidentally, the display unit 16 may be configured by a touch panel to display images corresponding to the various functions, such as a power key, a call receiving key, number keys, character keys, a direction key, a determination key, a call sending key, etc. thereon, and the display unit 16 may be configured to act as the operation unit 17 by the user's press of the corresponding image on the display unit 16.

In this embodiment, the acceleration sensor 18 is a two-axis acceleration sensor in capacitance type. The acceleration sensor 18 can detect an acceleration change in the mobile electronic device 10 (housing) in a two dimension, X axis and Y axis. The acceleration sensor 18 will be described with reference to FIGS. 2(A) and 2(B).

Figure 2:
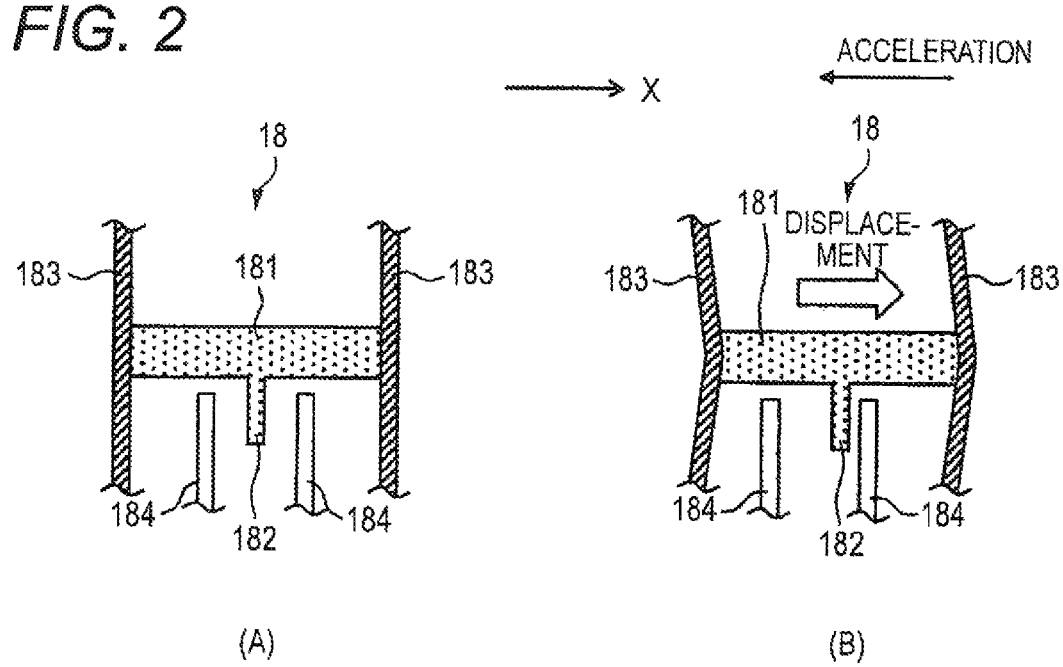
FIGS. 2(A) and 2(B) are cross-sectional views showing one example of a structure of an acceleration sensor according to embodiment of the present invention.

FIGS. 2(A) and 2(B) are cross-sectional views showing one example of a structure of the acceleration sensor according to embodiment of the present invention. FIG. 2(A) is a cross-sectional view showing a state when the housing is in a stationary state. FIG. 2(B) is a cross-section view showing a state when acceleration is generated. Incidentally, FIGS. 2(A) and 2(B) show the state of an acceleration sensor to one dimension (X axis).

As shown in FIG. 2(A), in the acceleration sensor 18, a comb weight 181 made of a conductive material is supported by two columns 183. Two electrodes 184 are disposed to sandwich the comb portion 182. Incidentally, FIG. 2(A) is one example of a structural drawing of an acceleration sensor. An actual acceleration sensor includes a plurality of comb portions 182 and electrodes 184 in order to obtain a capacitance required to detect an acceleration change.

When the mobile electronic device 10 is inclined, as shown in FIG. 2(B), acceleration is generated and the two columns are deformed. As a result, the location of the weight 181 is changed, and the capacitance between the comb portion 182 and the two electrodes 184 is changed.

As such, the acceleration sensor 18 determines a moved amount of the weight 181 as a change in capacitance and detects the acceleration generated to the housing, i.e., change in the location of the mobile electronic device 10. In other words, the acceleration sensor 18 detects the inclination of the mobile electronic device with respect to the horizontal plane. The acceleration sensor 18 outputs the detection result to the control unit 13.

In this embodiment, the fingerprint sensor 19 is a fingerprint sensor for scanning (reading) a difference in capacitance of fingerprint unevenness. The fingerprint sensor 19 may be, for example, an optical fingerprint sensor. The overview of the fingerprint sensor 19 will be described with reference to FIGS. 3 and 4.

Figure 3:
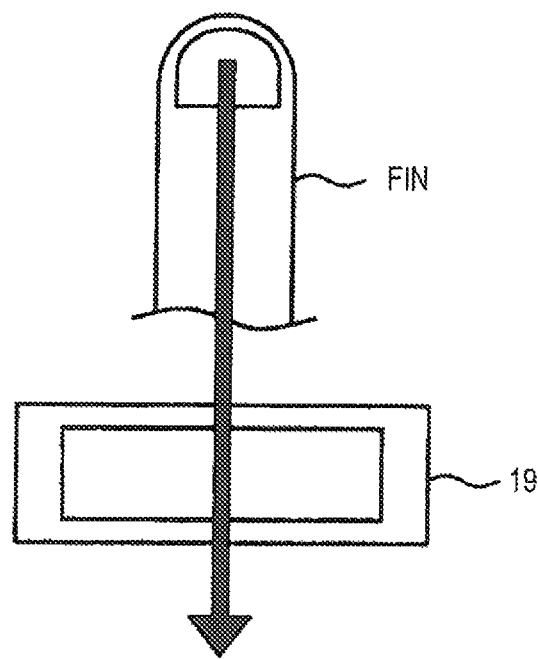
FIG. 3 is a schematic view showing one example of an exterior of a fingerprint sensor according to the embodiment of the present invention.
Figure 4:
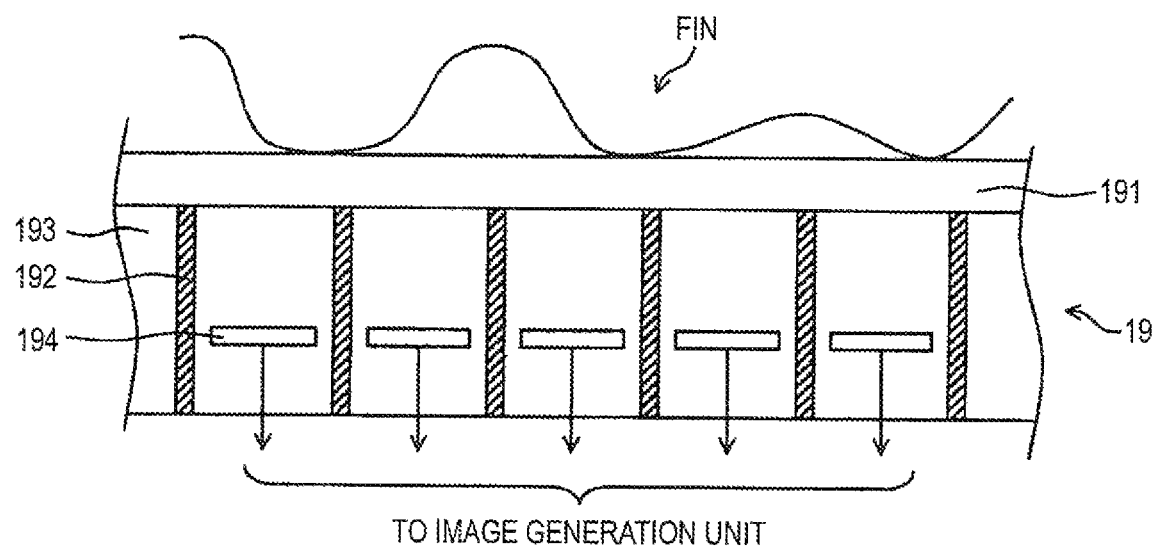
FIG. 4 is a cross-sectional schematic view showing one example of a configuration of the fingerprint sensor according to the embodiment of the present invention.

FIG. 3 is a schematic view showing one example of an exterior of the fingerprint sensor according to the embodiment of the present invention. FIG. 4 is a cross-sectional schematic view showing one example of a configuration of the fingerprint sensor according to the embodiment of the present invention.

As shown in FIG. 3, the fingerprint sensor 19 is a rectangular sensor having long sides and short sides, and the surface thereof (protective film 191, which will be described later) is exposed to the plate of the housing (mobile electronic device; 10). The user sweeps (moves) a finger FIN to the arrow direction in FIG. 3 while contacting the surface (fingerprint surface) of the finger FIN (subject to be detected) on the fingerprint sensor 19.

The fingerprint sensor 19 detects a difference in capacitance based on fingerprint unevenness. Additionally, the fingerprint sensor 19 scans (reads) a fingerprint (biometric information) the detected difference in capacitance. As such, since the fingerprint sensor 19 scans a fingerprint based on the sweep operation by a finger FIN, it is called a sweep type fingerprint sensor. That is, the fingerprint sensor 19 can detect an operation by the movement of the subject to be moved.

More specifically, as shown in FIG. 4, the fingerprint sensor 19 is configured to detect a sweep operation of the finger FIN by a hard protective film 191 on which the finger FIN contacts, a plurality of partitions 192, electrode chambers 193, and electrodes 194.

In the fingerprint sensor 19, a plurality of electrode chambers (about ten thousands of electrode chambers), which is divided into a plurality of partitions, is formed below the protective film 191, and an electrode 194 is disposed in each electrode chamber 193.

When the surface of the finger FIN contacts on the protective film 191, there is a distance between the surface of a finger FIN and the electrode 194 due to fingerprint unevenness. As such distance becomes shorter, more electronic charges are accumulated in the electrode 194. The fingerprint sensor 19 reads the electronic charges accumulated in the electrode 194 to output them to an image generation unit (not shown) within the fingerprint sensor 19.

The electronic charges accumulated in the electrode 194 are inputted to the image generation unit. The image generation unit numerates an amount of electronic charges and generates fingerprint data (biometric information) to perform a fingerprint authentication. The fingerprint sensor 19 outputs the fingerprint data generated by the image generation unit to the control unit 13. Then, the control unit 13 authenticates a fingerprint based on a comparison of the outputted fingerprint data with the reference fingerprint data RDAT memorized in the storage unit 14.

Incidentally, FIG. 3 exemplifies the case where the finger FIN is swept from the upper portion of the fingerprint sensor 19 to the lower portion of the fingerprint sensor 19 (arrow direction). The sweep direction of the finger FIN may be set suitable for the location of the fingerprint sensor 19, such as from the lower portion of the fingerprint sensor 19 to the upper portion of the fingerprint sensor 19 (back arrow direction).

Figure 5:
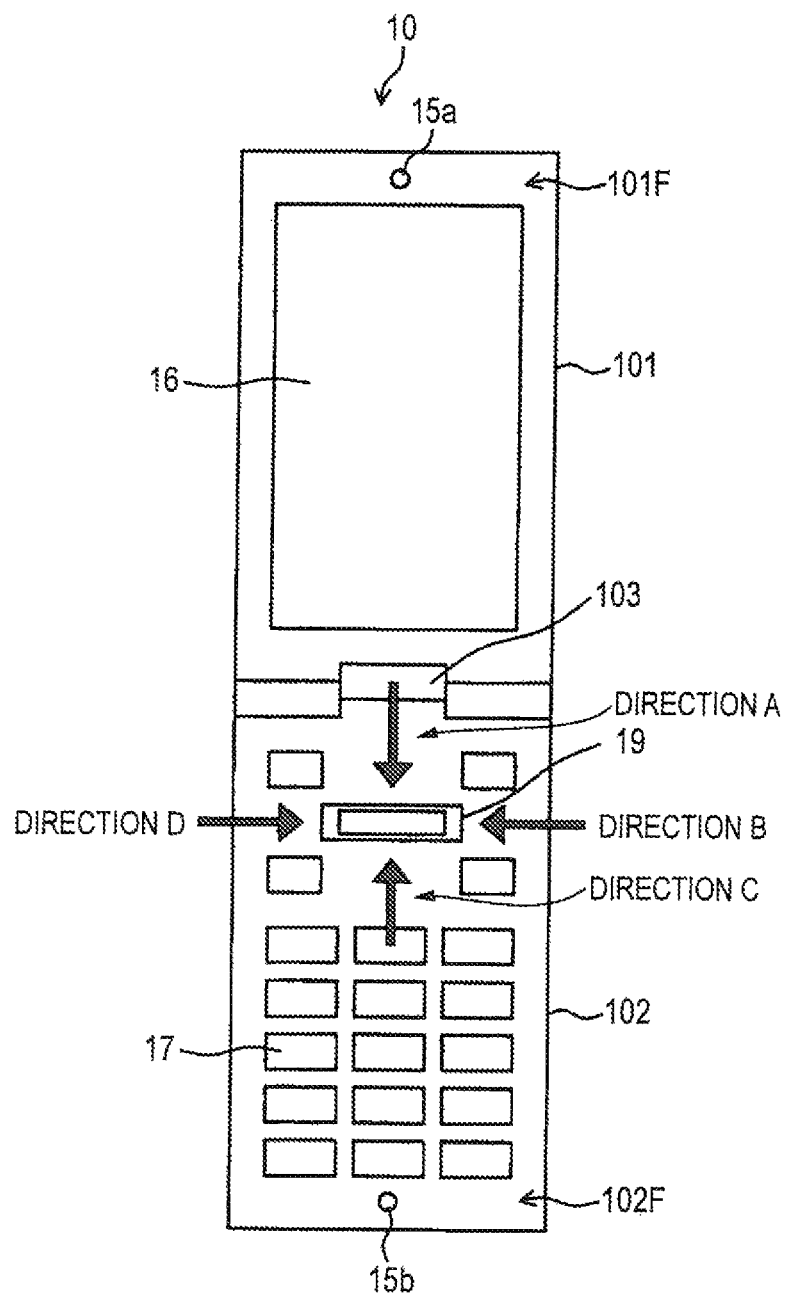
FIG. 5 is a sectional schematic view showing one example of an exterior of the mobile electronic device according to the embodiment of the present invention.

Each of the above-described elements shown in FIG. 1 is included in the housing (mobile electronic device; 10) shown in FIG. 5.

FIG. 5 is a sectional schematic view showing one example of an exterior of the mobile electronic device according to the embodiment of the present invention.

As shown in FIG. 5, an upper housing 101 and a lower housing 102 of the mobile electronic device 10 are connected by a hinge 103. The mobile electronic device 10 is a shell type (or a folder type) mobile electronic device capable of opening and closing the upper housing and the lower housing. FIG. 5 shows a mobile electronic device, the upper and lower housings of which are opened.

In a close state when the upper and lower housings are opened, the display unit 16 and the speaker 15a are disposed on the surface 101F of the upper housing 101. On the surface 102F of the lower housing 102, various keys of the activation unit 17, the microphone 15b, and the fingerprint sensor 19 are disposed.

The fingerprint sensor 19 is configured to detect a sweep operation in four directions. Thus, the fingerprint sensor 19 is disposed in the upper portion of the activation unit 17 in the lower housing 102 (end of the hinge 103 in the lower housing 102) for easier sweep of the finger FIN.

As shown in FIG. 5, the fingerprint sensor 19 is configured to detect a sweep operation (operation of sweep direction A) from the upper portion of the fingerprint sensor 19 to the lower portion of the fingerprint sensor 19 (end opposite to the hinge 103), a sweep operation (operation of sweep direction B) from the right side of the fingerprint sensor 19 (one side of the width direction of the lower housing 102) to the left side of the fingerprint sensor 19 (another side of the width direction of the lower housing 102), a sweep operation (operation of sweep direction C) from the lower portion of the fingerprint sensor 19 to the upper portion of the fingerprint sensor 19, and a sweep operation (operation of sweep direction B) from the left side of the fingerprint sensor 19 to the right side of the fingerprint sensor 19.

Incidentally, the sweep directions may not be the above-described four directions. For example, the sweep directions may be only two directions, sweep direction A and sweep direction B. The sweep direction may be inclined with respect to the fingerprint sensor 19. The location of the fingerprint sensor 19 may be appropriately selected.

Figure 6:
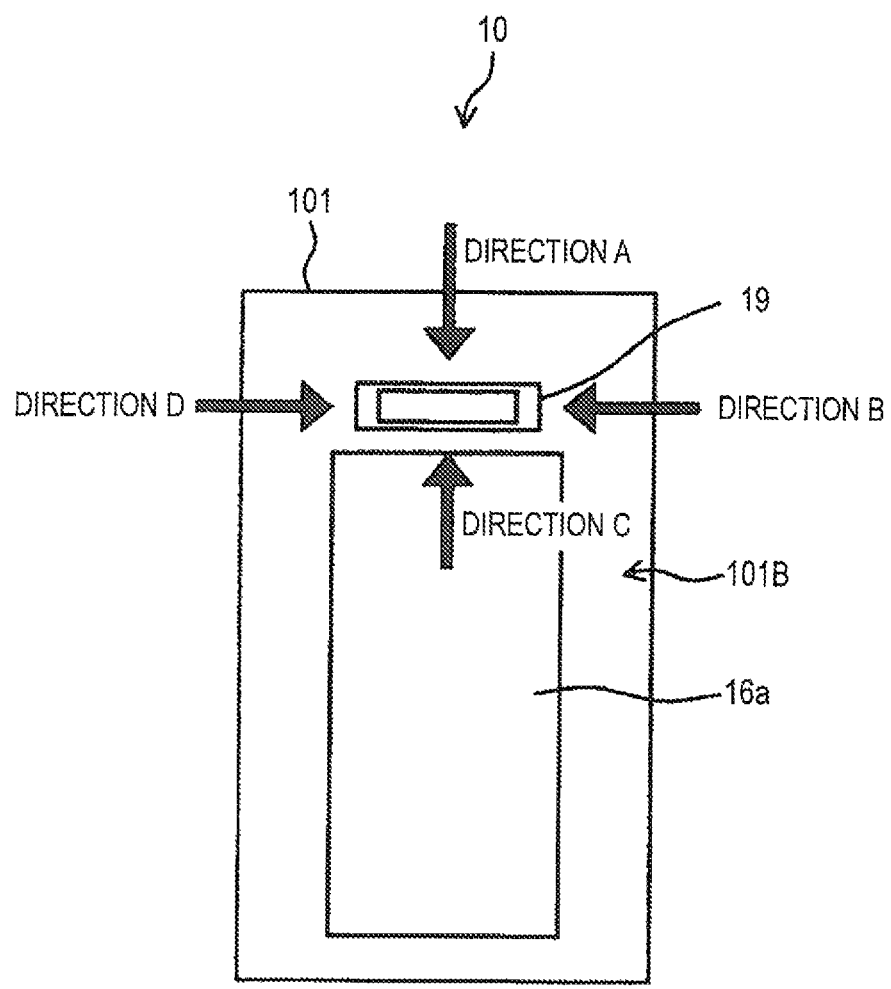
FIG. 6 is a sectional schematic view showing one example of the exterior of the mobile electronic device according to the embodiment of the present invention.

FIG. 6 is a sectional schematic view showing one example of an exterior of the mobile electronic device according to the embodiment of the present invention.

As shown in FIG. 6, the fingerprint sensor 19 is disposed on the back 101B of the upper housing 101, as well as on the surface 102F of the lower housing 102. The back 101B is opposite to the surface 101F of the upper housing 101. A sub-display unit 16a capable of displaying messages, etc. is disposed in a vicinity of the fingerprint sensor 19. The sub-display unit 16a is configured by a display device that is the same as the display device disposed on the surface 101F of the upper housing 101. Even when the mobile electronic device 10 is closed, the user can check messages, etc. through the sub-display unit 16a.

Even when the fingerprint sensor 19 is disposed on the back 101B of the upper housing 101, the fingerprint sensor 19 can perform the above-described four-direction oriented sweeps.

Since the sweep type fingerprint sensor 19 sweeps a finger, an accuracy of fingerprint detection depends on sweep directions. Also, the success rates of fingerprint authentication are different. If the success rate is high, a comparison (pattern match or check) of a fingerprint scanned by the fingerprint sensor 19 with a pre-registered fingerprint is accurate.

The relationship between the sweep direction of the finger and the success rate of fingerprint authentication will be described. Incidentally, it is assumed that the success rate of fingerprint authentication does not depend only on the location of the fingerprint sensor 19.

Since the operations of sweep direction A and sweep direction C are performed by the movement between the long sides of the fingerprint sensor 19, it is possible to obtain a broad area for detecting the sweep operations by the fingerprint sensor 19. Thus, a high accuracy of fingerprint detection and a high success rate of fingerprint authentication can be obtained. On the other hand, since the operations of sweep direction B and sweep direction D are performed by the movement between the short sides of the fingerprint sensor 19, an area for detecting the sweep operations by the fingerprint sensor 19 becomes narrower than the area for detecting the operations of sweep direction A and sweep direction C. Thus, a low accuracy of fingerprint detection and a lower success rate of fingerprint authentication may be obtained compared to the operations of sweep direction A and sweep direction C.

In other words, a sweep direction having a higher success rate of fingerprint authentication has the highest accurate pattern matching between a scanned fingerprint and a pre-registered fingerprint, and thus an accurate fingerprint authentication can be performed without a need of repeating scanning several times.

A shortcut activation function (predetermined action) of the mobile electronic device 10 makes the control unit 13 activate or operate a pre-allocated application by fingerprint detection based on the sweep operation detected by the fingerprint sensor 19. For easier operation, it is preferable to sweep the finger to the horizontal plane. For more accurate fingerprint detection, it is preferable to detect the fingerprint by the operations of sweep direction A or sweep direction C. However, the mobile electronic device 10 is not always grasped in a state where the mobile electronic device 10 can be easily operated and the fingerprint can be accurately detected.

An explanation is provided with reference to specific examples. The mobile electronic device 10 is often put into a pocket or a bag because of its portability. In this case, when the user takes the mobile electronic device 10 out of the pocket or bag and grasps the mobile electronic device 10 in order to use the shortcut activation function, the housing thereof is not always toward the direction where the operation of sweep direction A can be easily performed (i.e., a direction toward the horizontal plane). For example, the mobile electronic device 10 sometimes may be in the direction where the operation of sweep direction C can be easily performed. Here, if the mobile electronic device 10 is set unable to detect a fingerprint based on the operation of sweep direction C detected by the fingerprint sensor 19, the user is required to grasp the mobile electronic device 10 again to perform the operation of sweep direction A.

In order to resolve such inconvenience, the mobile electronic device 10 change sweep operation directions (operation detection) detected by the fingerprint sensor 19 according to an inclination state of the housing detected by the acceleration sensor 18. Thus, when the user grasps the mobile electronic device 10, the user can perform the sweep operation according to the direction of the housing. Herein, a relationship between the inclination state of the mobile electronic device 10 and the sweep operation of the fingerprint sensor 19 will be described.

(Relationship Between an Operation of Sweep Direction A and an Inclination State)

Figure 7:
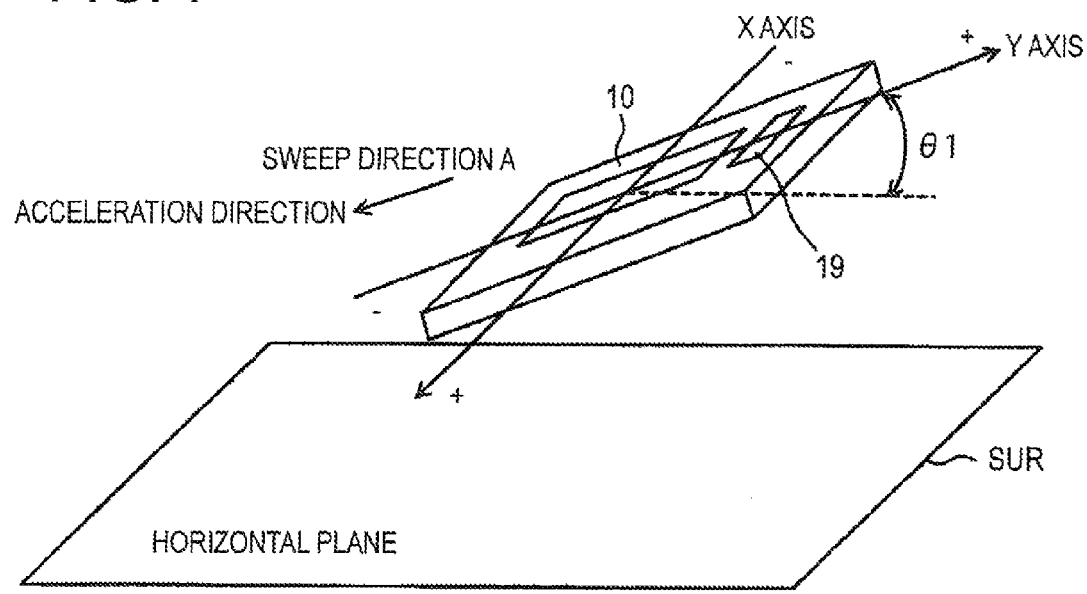
FIG. 7 explains a relationship between an inclination state of the mobile electronic device and a fingerprint authentication by an operation of sweep direction A according to the embodiment of the present invention.
Figure 8:
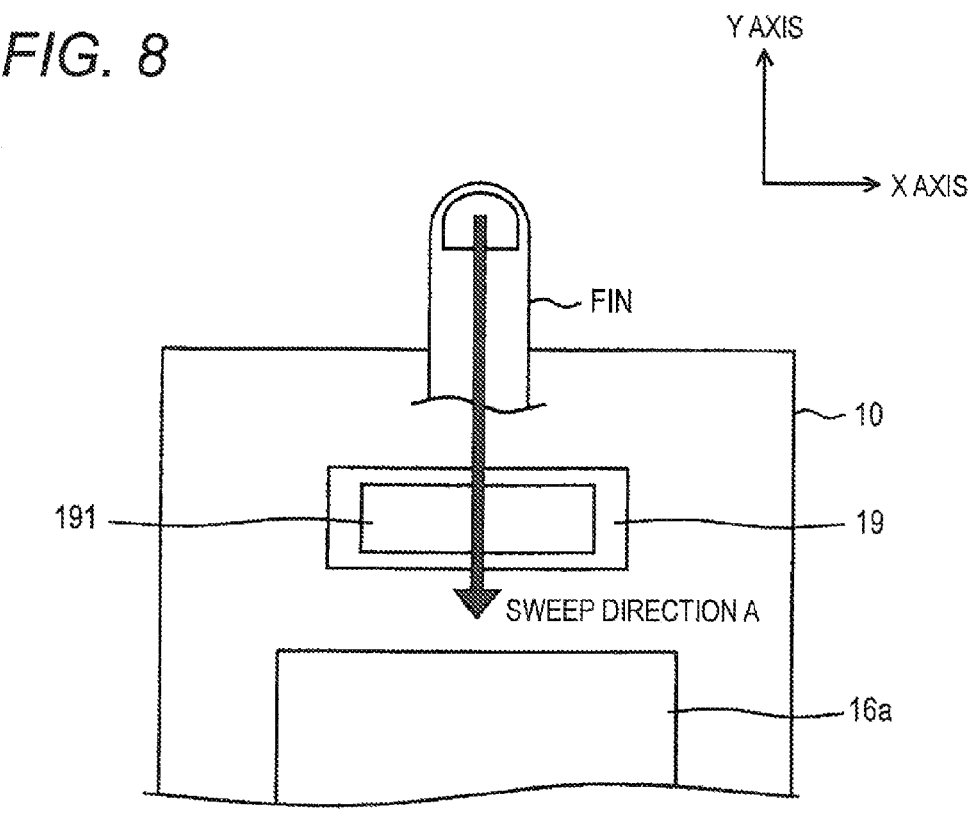
FIG. 8 explains a sweep operation according to the embodiment of the present invention.

FIG. 7 explains the relationship between an inclination state and the fingerprint authentication by the operation of sweep direction A in the mobile electronic device according to the embodiment of the present invention. FIG. 8 explains the sweep operation according to the embodiment of the present invention.

As shown in FIG. 7, when the mobile electronic device 10 is inclined (to the horizontal plane) from the upper portion (+ direction of Y axis) to the lower portion (− direction of Y axis) with respect to the horizontal plane SUR, acceleration is generated according to this inclination direction. The acceleration sensor 18 detects this acceleration, i.e., the inclination of the mobile electronic device 10, and outputs the detection result to the control unit 13.

The fingerprint sensor 19 receives the detection result of the acceleration sensor 18 from the control unit 13 and enables a fingerprint detection based on the operation of sweep direction A according to the inclination direction. Accordingly, as shown in FIG. 8, the user can sweep the finger FIN on the fingerprint sensor 19 to the inclination direction of the mobile electronic device 10, i.e., to the horizontal plane SUR.

Incidentally, the acceleration sensor 18 detects the inclination of the mobile electronic device 10 when an angle θ1 between the horizontal plane SUR and Y axis is a threshold angle $\theta_{TH}$ or less. Such threshold angle $\theta_{TH}$ is, for example, 60°. The threshold angle $\theta_{TH}$ is a preferable inclination angle at which the acceleration sensor 18 can detect acceleration.

(Relationship Between an Operation of Sweep Direction C and an Inclination State)

Figure 9:
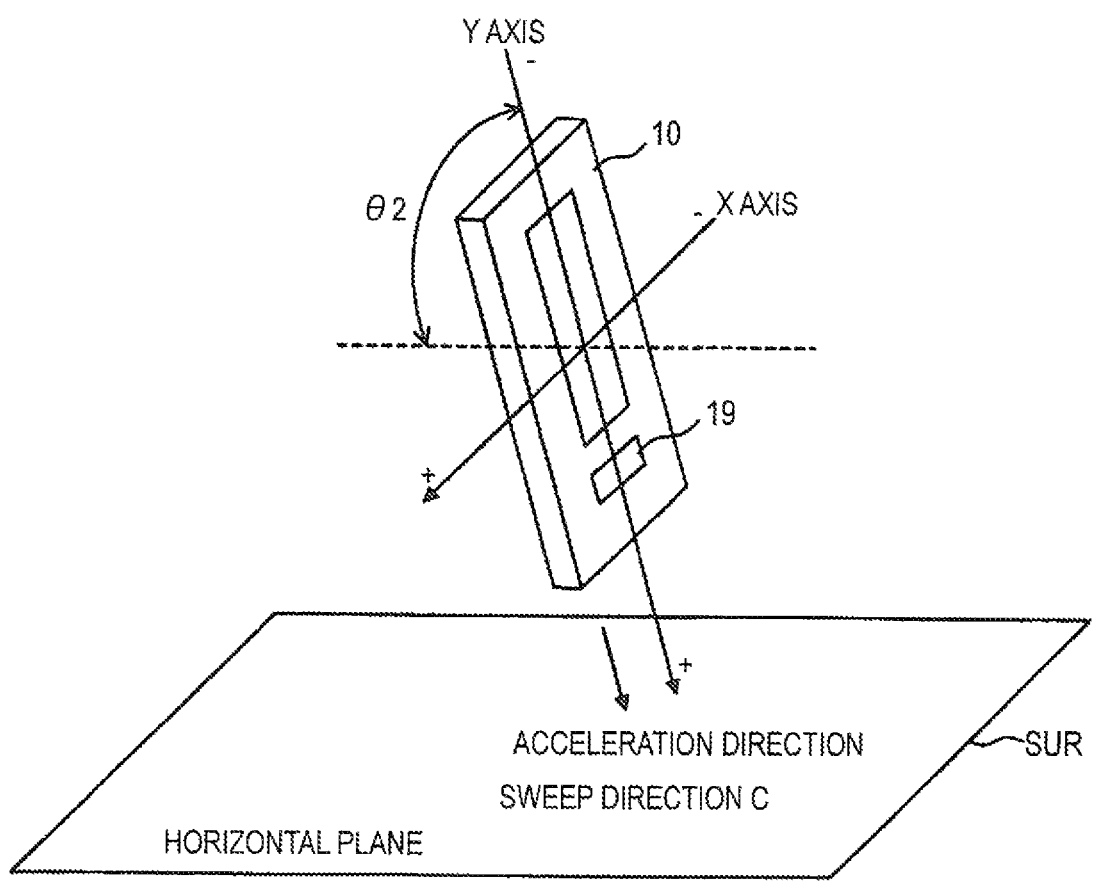
FIG. 9 explains a relationship between an inclination state of the mobile electronic device and a fingerprint authentication by an operation of sweep direction C according to the embodiment of the present invention.
Figure 10:
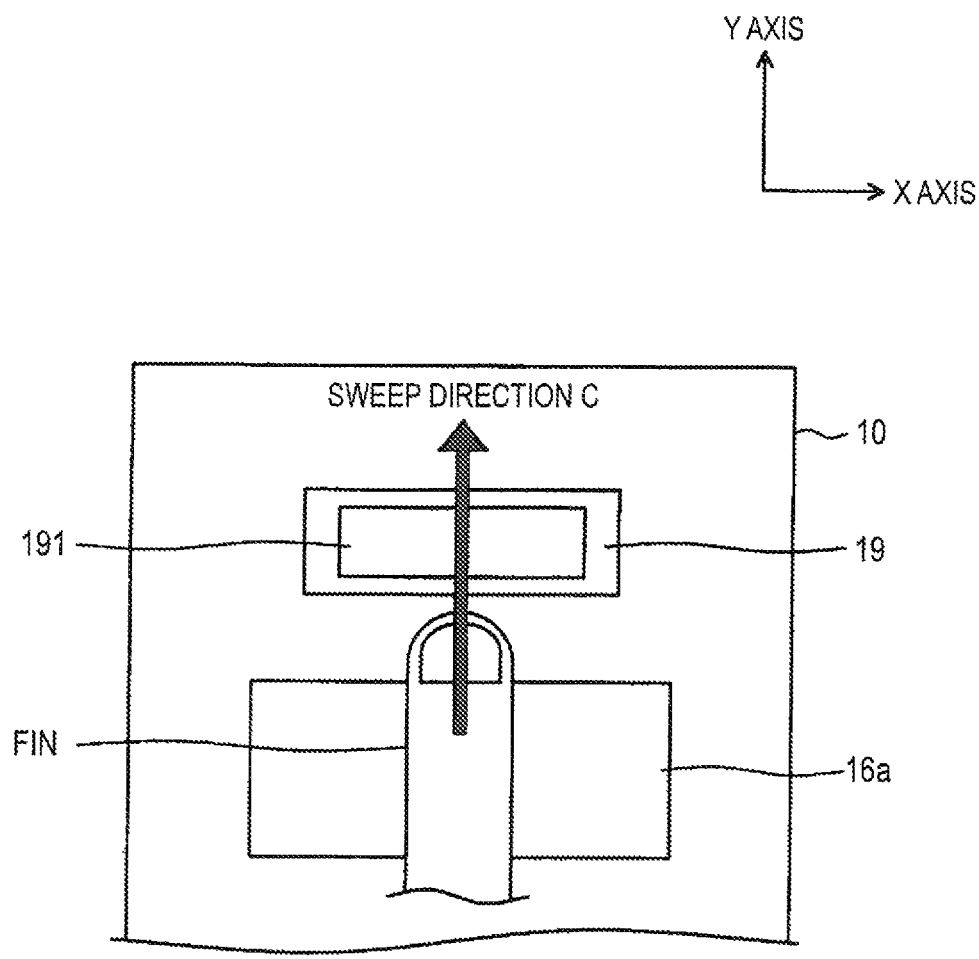
FIG. 10 explains the sweep operation according to the embodiment of the present invention.

FIG. 9 explains the relationship between an inclination state and the fingerprint authentication by the operation of sweep direction C in the mobile electronic device according to the embodiment of the present invention. FIG. 10 explains the sweep operation according to the embodiment of the present invention.

As shown in FIG. 9, when the mobile electronic device 10 is inclined (to the horizontal plane) from the lower portion (− direction of Y axis) to the upper portion (+ direction of Y axis) with respect to the horizontal plane SUR, acceleration is generated based on this inclination direction. The acceleration sensor 18 detects this inclination and outputs the detection result to the fingerprint sensor 19.

The fingerprint sensor 19 receives the detection result of the acceleration sensor 18 from the control unit 13 and enables a fingerprint detection based on the operation of sweep direction C according to the inclination direction. Accordingly, as shown in FIG. 10, the user can sweep the finger FIN on the fingerprint sensor 19 to the inclination direction of the mobile electronic device 10, i.e., to the horizontal plane SUR.

Incidentally, when an angle θ2 between the horizontal plane SUR and Y axis is a threshold angle $\theta_{TH}$ or less, the acceleration sensor 18 detects the inclination of the mobile electronic device 10.

(Relationship Between the Operation of Sweep Direction B and an Inclination)

Figure 11:
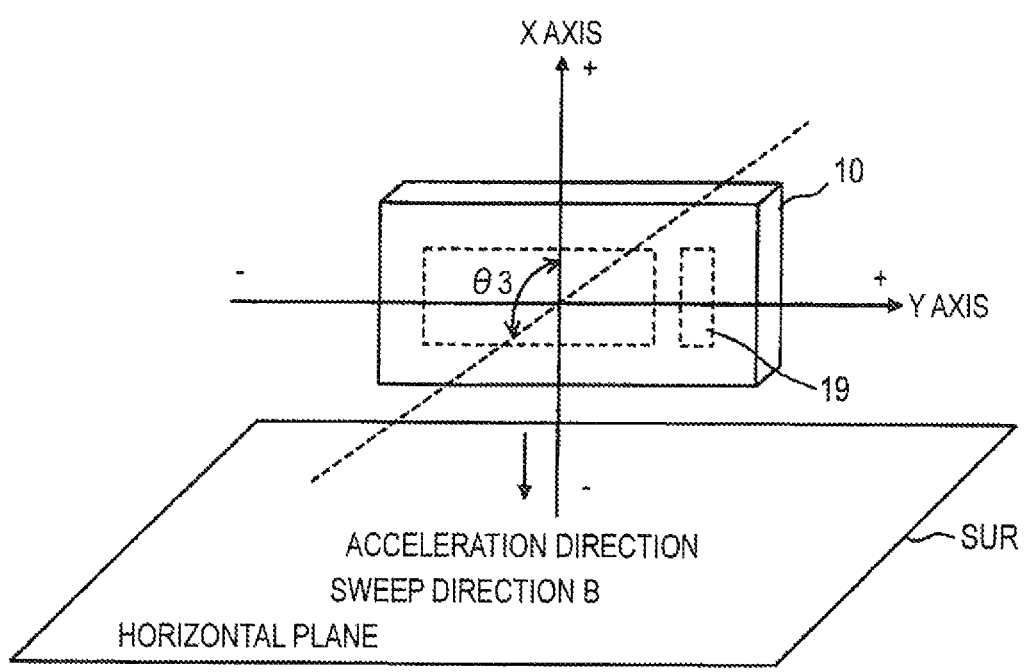
FIG. 11 explains a relationship between an inclination state of the mobile electronic device and a fingerprint authentication by an operation of sweep direction B according to the embodiment of the present invention.
Figure 12:
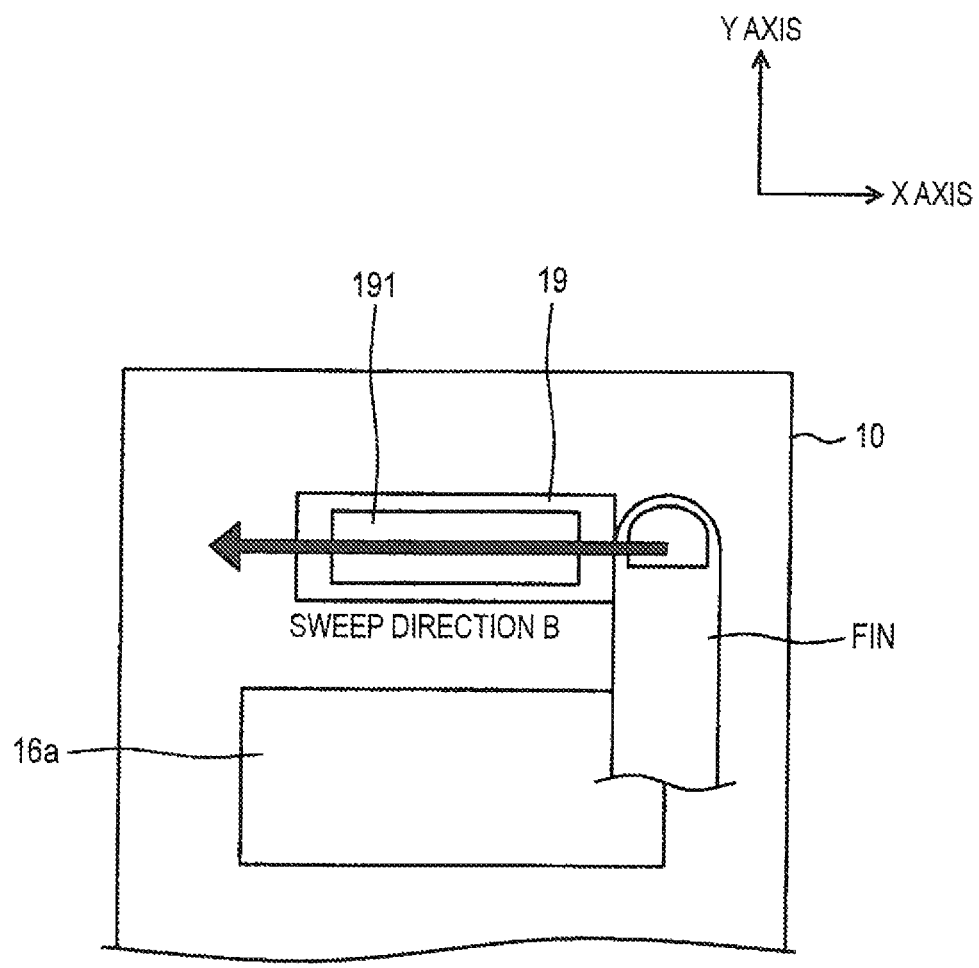
FIG. 12 explains the sweep operation according to the embodiment of the present invention.

FIG. 11 explains the relationship between an inclination state and the fingerprint authentication by the operation of sweep direction B in the mobile electronic device according to the embodiment of the present invention. FIG. 12 explains the sweep operation according to the embodiment of the present invention.

As shown in FIG. 11, when the mobile electronic device 10 is inclined (toward the horizontal plane) from the right side (+ direction of X axis) to the left side (− direction of X axis) with respect to the horizontal plane SUR, acceleration is generated based on this inclination direction. The acceleration sensor 18 detects this inclination and outputs the detection result to the control unit 13.

The fingerprint sensor 19 receives the detection result of the acceleration sensor 18 from the control unit 13 and enables a fingerprint detection based on the operation of sweep direction B according to the inclination direction. As a result, as shown in FIG. 12, the user can sweep the finger FIN on the fingerprint sensor 19 to the inclination direction of the mobile electronic device 10, i.e., to the horizontal plane SUR.

Incidentally, the acceleration sensor 18 detects the inclination of the mobile electronic device 10 when an angle θ3 between the horizontal plane SUR and X axis is a threshold angle $\theta_{TH}$ or less.

(Relationship Between an Operation of Sweep Direction D and an Inclination State)

Figure 13:
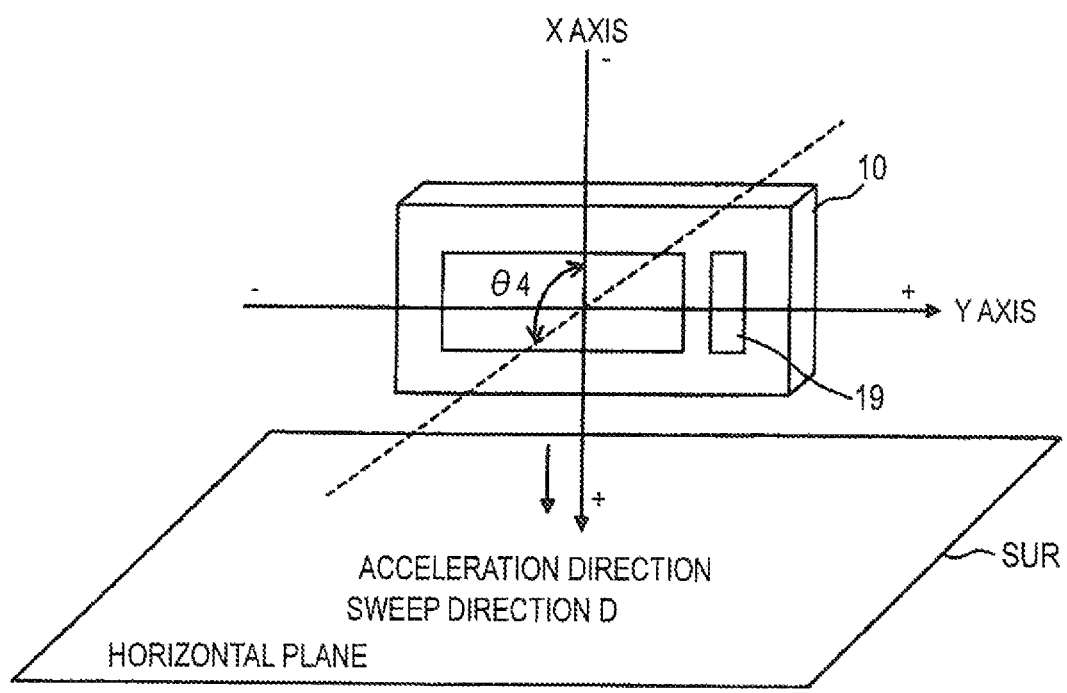
FIG. 13 explains a relationship between an inclination state of the mobile electronic device and a fingerprint authentication by an operation of sweep direction D according to the embodiment of the present invention.
Figure 14:
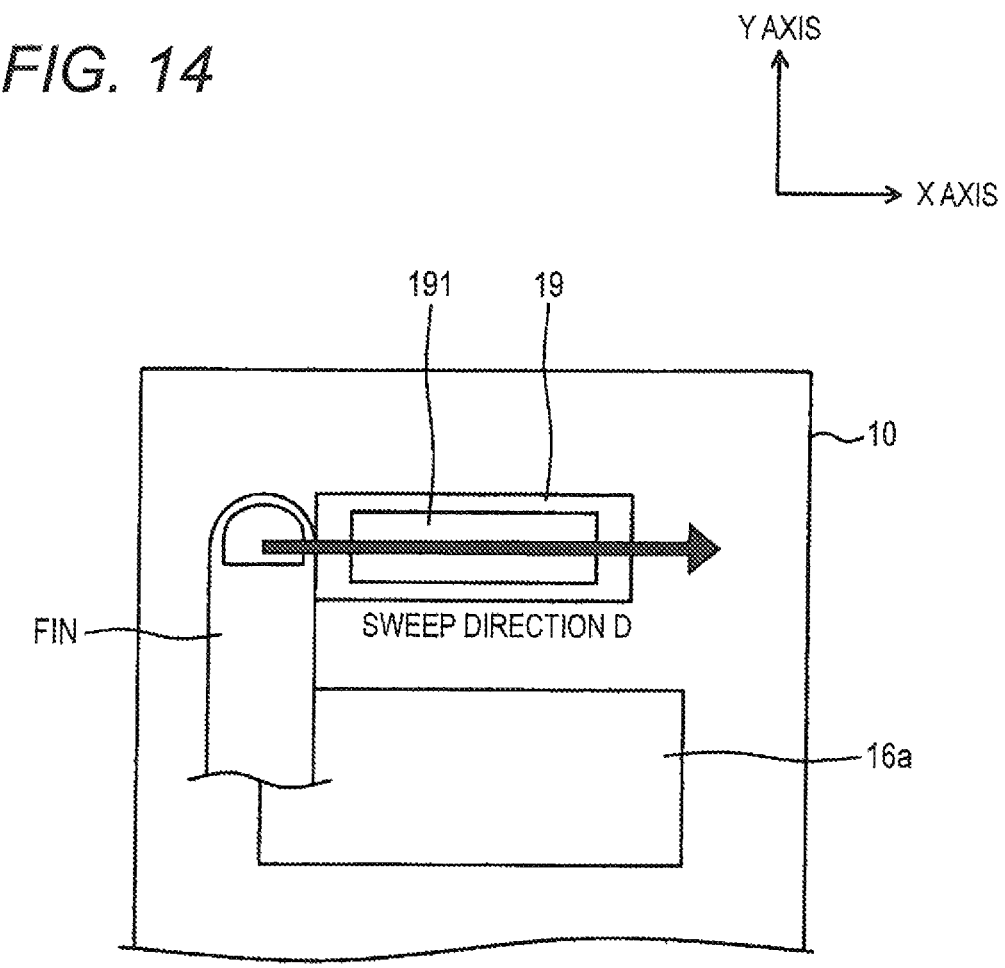
FIG. 14 explains the sweep operation according to the embodiment of the present invention.

FIG. 13 explains the relationship between an inclination state and the fingerprint authentication by the operation of sweep direction D in the mobile electronic device according to the embodiment of the present invention. FIG. 14 explains the sweep operation according to the embodiment of the present invention.

As shown in FIG. 13, when the mobile electronic device 10 is inclined (to the horizontal plane) from the left side (− direction of X axis) to the right side (+ direction of X axis) with respect to the horizontal plane SUR, acceleration is generated based on this inclination direction. The acceleration sensor 18 detects this inclination and outputs the detection result to the control unit 13.

The fingerprint sensor 19 receives the detection result of the acceleration sensor 18 from the control unit 13 and enables a fingerprint detection based on the operation of sweep direction D according to the inclination direction. Accordingly, as shown in FIG. 14, the user can sweep the finger FIN on the fingerprint sensor 19 to the inclination direction of the mobile electronic device 10, i.e., to the horizontal plane SUR.

Incidentally, the acceleration sensor 18 detects the inclination of the mobile electronic device 10 when an angle θ4 between the horizontal plane SUR and Y axis is a threshold angle $\theta_{TH}$ or less.

As described above, the sweep direction of the fingerprint sensor 19 may be changed in the inclination state of the mobile electronic device 10 detected by the acceleration sensor 18. Thus, irrespective of inclinations, the shortcut function can be appropriately performed. Incidentally, as described above, the accuracy of the fingerprint detection by the operation of sweep directions B and D is lower than the accuracy of the fingerprint detection by the operation of sweep directions A and C.

Therefore, when detecting the fingerprint by the operation of sweep directions B and D, the fingerprint detection by sweep operation can be successfully completed by lowering the fingerprint authentication level (accuracy of pattern matching) than a usual level.

Figure 15:
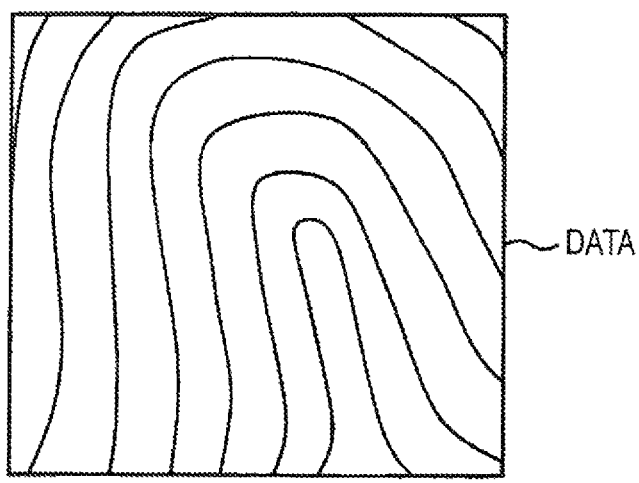
FIG. 15 is a schematic view of a fingerprint to explain a general fingerprint authentication according to the embodiment of the present invention.

FIG. 15 is a schematic view of a fingerprint to explain a general fingerprint authentication according to the embodiment of the present invention. Incidentally, a solid line in FIG. 15 indicates the fingerprint.

In this case, if the fingerprint is scanned, the fingerprint sensor 19 generates fingerprint data DATA regarding the fingerprint exemplified in FIG. 15 and outputs the fingerprint data DATA to the control unit 13. Thereafter, the control unit 13 compares the fingerprint data DATA inputted from the fingerprint sensor 19 with pre-registered fingerprint data RDAT in the storage unit 14. Additionally, if the two fingerprints match, the control unit 13 permits an authentication. Such fingerprint authentication is called as a general fingerprint authentication.

Figure 16:
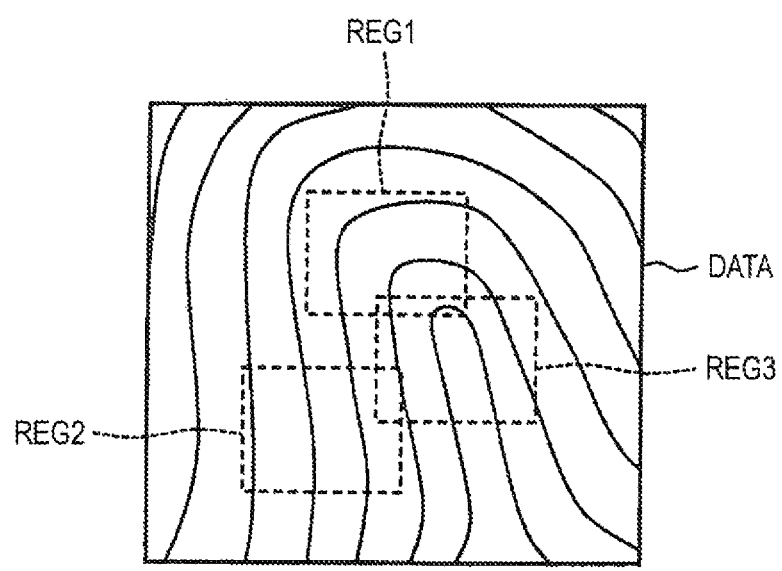
FIG. 16 is a schematic view of a fingerprint to explain a lower-level fingerprint authentication than a general fingerprint authentication according to the embodiment of the present invention.

FIG. 16 is a schematic view of the fingerprint to explain a lower-level fingerprint authentication than the general fingerprint authentication according to the embodiment of the present invention. The lines in FIG. 16 indicate the same fingerprint in FIG. 15.

In a lower-level fingerprint authentication than the above-described general fingerprint authentication, only a part of the fingerprint is the subject to be compared with the reference fingerprint data RDAT. Specifically, the control unit 13 extracts regions having features (feature points) from the fingerprint. The examples of such feature points are three regions REG 1-3 illustrated as broken lines in FIG. 16. The control unit 13 compares whether the feature points extracted from each of regions REG 1-3 match the corresponding regions in the reference fingerprint data RDAT in the storage unit 14. If they match, the control unit 13 performs an authentication. Such fingerprint authentication is called as a lower-level fingerprint authentication.

Then, if the acceleration sensor 18 detects that the mobile electronic device 10 is inclined from the upper portion to the lower portion with respect to the horizontal plane and, as a result, it becomes possible to detect a fingerprint based on the operation of sweep direction A having a high accuracy of fingerprint detection, the control unit 13 performs a general fingerprint authentication. In a similar manner, if the acceleration sensor 18 detects that the mobile electronic device 10 is inclined from the lower portion to the upper portion with respect to the horizontal plane and, as a result, it becomes possible to detect the fingerprint based on the operation of sweep direction C having a high accuracy of fingerprint detection, the control unit 13 performs the general fingerprint authentication.

On the other hand, if the acceleration sensor 18 detects that the mobile electronic device 10 is inclined from the right side to the left side with respect to the horizontal plane and, as a result, it is possible to detect a fingerprint based on the operation of sweep direction B having a low accuracy of fingerprint detection, the control unit 13 performs the low-leveled fingerprint authentication. In a similar manner, if the acceleration sensor 18 detects that the mobile electronic device 10 is inclined from the left side to the right side with respect to the horizontal plane and, as a result, it becomes possible to detect the fingerprint based on the operation of sweep direction D having a low accuracy of fingerprint detection, the control unit 13 performs the low-leveled fingerprint authentication.

As such, the mobile electronic device 10 can change the direction of comparing the fingerprint detected by the fingerprint sensor 19 with the reference fingerprint data RDAT stored in the storage unit 14 according to the inclination state detected by the acceleration sensor 18. As a result, the mobile electronic device 10 can appropriately the shortcut function irrespective of inclinations and successfully authenticate the fingerprint.

Incidentally, where an application requiring high security, such as an electronic cash function, is allocated to the shortcut activation function, the level of the fingerprint authentication is not lowered and the general fingerprint authentication may be performed, even though the operation of sweep direction B or D is detected.

FIG. 17 shows one example of an allocation of application regarding a shortcut activation function according to the embodiment of the present invention.

As shown in FIG. 17, based on the operation of sweep directions A and C having a high success rate of fingerprint authentication, the general fingerprint authentication is performed. Based on the operation of sweep directions B and D having a low success rate of fingerprint authentication, the low-level fingerprint authentication that compares only a part of the fingerprint with the reference fingerprint data RDAT is performed.

As described above, where an application requiring high security is allocated to the shortcut activation function, the general fingerprint authentication is performed, even though the operation of sweep direction B or D is detected. Thus, if a general activation, an electronic cash function, and an infrared transmitting/receiving function are allocated to the shortcut activation function, the general fingerprint authentication is performed. The general activation refers to a function that allows all the functions of the mobile electronic device 10 to be used.

On the other hand, where an application not requiring high security is allocated to the shortcut activation function, only the low-level fingerprint authentication is performed, if the operation of sweep direction B or D is detected. Thus, if for example, a clock function, a silent mode function, a One-Seg service function, an infrared remote controller function, a radio function, and a music reproduction function are allocated to the shortcut activation function, the fingerprint authentication level is lowered according to the sweep operation direction.

In other words, if an application using personal information, such as an electronic cash function, is allocated to the shortcut activation function, the control unit 13 performs the general fingerprint authentication without lowering the fingerprint authentication level. However, if an application not using personal information, such as a One-Seg service function, is allocated to the shortcut activation function, the control unit 13 performs the low-level fingerprint authentication according to the sweep direction operation. As such, since the mobile electronic device 10 can change a comparison method depending on the above-described applications, it is possible to successfully perform a fingerprint authentication in accordance with the inclination state while increasing security.

Hereinafter, actions of the mobile electronic device 10 will be described with reference to FIG. 18.

Figure 18:
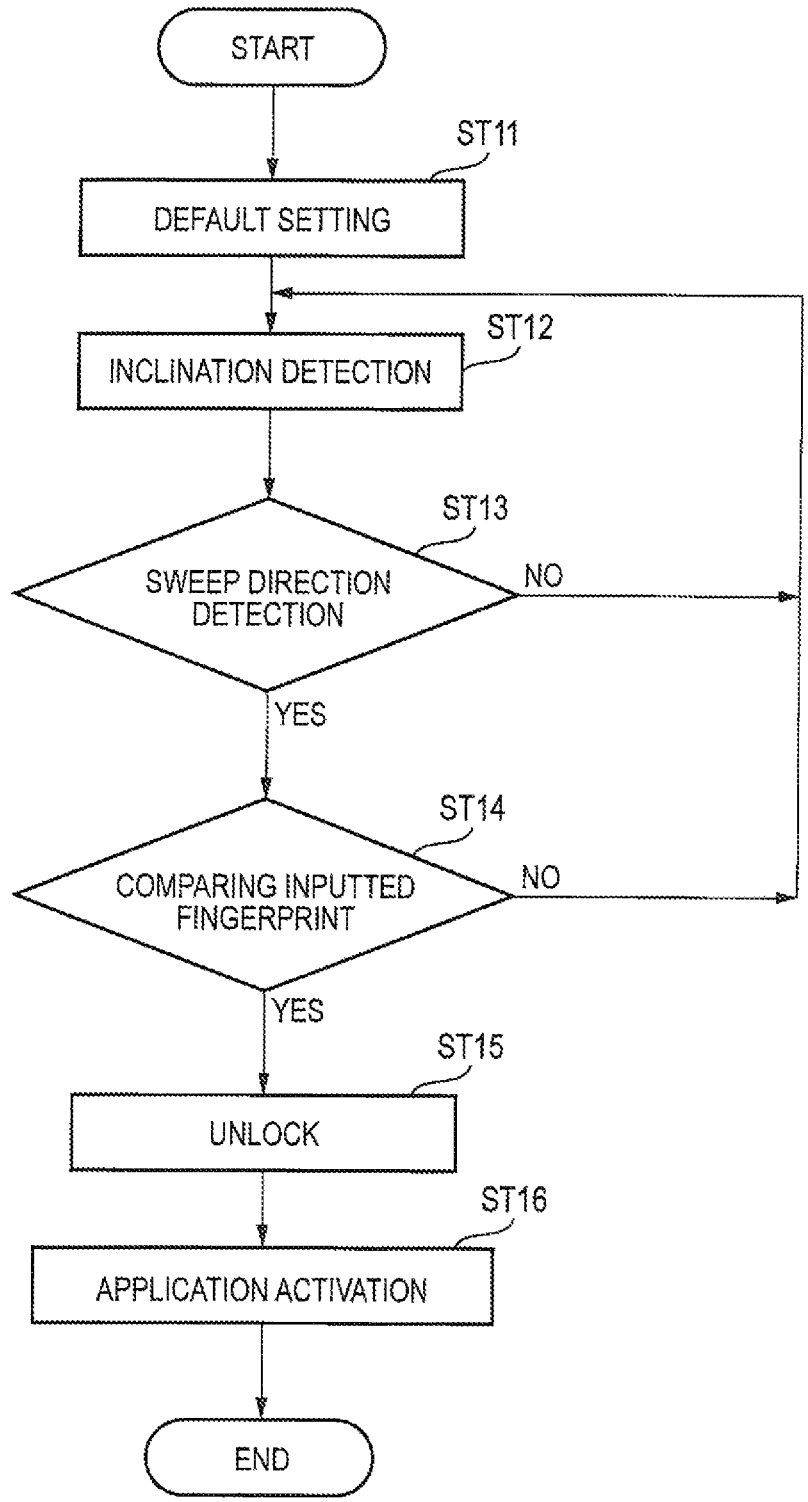
FIG. 18 is a flow chart showing one example of an action of the mobile electronic device according to the embodiment of the present invention.

FIG. 18 is a flow chart showing one example of the action of the mobile electronic device according to the embodiment of the present invention.

The default setting of the mobile electronic device 10 is performed (Step ST11). In this default setting, a One-Seg service function is allocated to an application activated by the sweep operation. Additionally, in the default setting, the user's fingerprint (particular biometric information) is registered in the reference fingerprint data RDAT.

On the presumption that the user grasps the mobile electronic device 10, the acceleration sensor 18 detects the inclination of the mobile electronic device 10 with respect to the horizontal plane SUR (Step ST12). Then, the acceleration sensor 18 outputs the result of the inclination detection to the control unit 13.

The fingerprint sensor 19 receives the detection result of the acceleration sensor 18 from the control unit 13 and enables the fingerprint detection based on the sweep direction operation according to the inclination direction (Step ST13).

In Step ST13, if the fingerprint sensor 19 detects the fingerprint (ST13: YES), the control unit 13 performs a comparison of inputted fingerprint data (Step ST14). On the other hand, if the fingerprint sensor 19 does not detect the fingerprint (ST13: NO), the inclination is detected again (Step ST12).

The user sweeps the finger FIN on the fingerprint sensor 19 to the horizontal plane SUR according to the inclination of the mobile electronic device 10. At this time, the fingerprint sensor 19 scans the fingerprint and outputs the scanned fingerprint data DATA to the control unit 13. Then, the control unit 13 performs the general fingerprint authentication by comparing the fingerprint data DATA with the reference fingerprint data RDAT pre-registered in the storage unit 14 (Step ST14).

However, since the One-Seg service function not requiring high security is allocated to the shortcut activation function, if the fingerprint sensor 19 detects the fingerprint based on the operation of sweep direction B or D, the control unit 13 performs the lower-level fingerprint authentication.

In Step ST14, if the fingerprint data DATA and the reference fingerprint data RDAT match (ST14: YES), the control unit 13 unlocks the function allocated to the shortcut activation function. In this embodiment, the application (for example, One-Seg service function) is activated (Step ST15). However, if the fingerprint data DATA and the reference fingerprint data RDAT do not match (ST14: NO), the inclination is detected again (Step ST12).

If the fingerprint data DATA and the reference fingerprint data RDAT match, the application is activated or operated. As a result, the shortcut activation function is finished.

However, in the default setting (Step ST11), if an electronic cash function, etc., requiring high security is allocated and the fingerprint sensor 19 enables the fingerprint detection based on the operation of sweep direction B or D (Step ST14), the control unit 13 performs the general fingerprint authentication without lowering the fingerprint authentication level.

According to this embodiment, since the application is automatically activated or operated by using a sweep operation at the time of the fingerprint authentication as a trigger, the user can quickly use the intended function.

At this time, by changing a sweep operation direction according to the inclination state of the mobile electronic device 10, the user can perform the sweep operation irrespective of the direction of the mobile electronic device in the user's hand. Furthermore, it is possible to reduce dedicated application keys for activating a desired function.

It is possible to change a fingerprint authentication level according to a desired security level. For example, where an application requiring high security, such as an electronic cash function, is allocated to the shortcut activation function, the general fingerprint authentication is performed without lowering the fingerprint authentication level even though the operation of sweep direction B or D having a low accuracy of fingerprint authentication is performed. Therefore, it is possible to obtain high security.

As a modification of this embodiment, a geomagnetic sensor capable of detecting directions can be used instead of the acceleration sensor. In this case, the direction of the upper portion (+ direction of Y axis illustrated in FIG. 7) of the mobile electronic device 10 is related to the sweep operation direction. For example, when the user sweeps a finger along sweep direction A, the application is activated by making the mobile electronic device 10 toward north.

In this embodiment, the fingerprint sensor 19 is configured to detect the sweep operation and the direction of the sweep operation detection is changed to the horizontal plane according to the result defected by the acceleration sensor 18. However, the present invention is not limited to this embodiment. For example, it is possible to change the direction of the sweep operation to comply with design details, such as location, size, area, etc. of the fingerprint sensor 19 that are not related to the direction to the horizontal plane, according to the result defected by the acceleration sensor 18.

The fingerprint sensor 19 may be configured to detect an operation not involving sweep (movement). In this case, for example, the control unit 13 changes the area of the detection operated by the fingerprint sensor 19 according to the result detected by the acceleration sensor 18 and, thus, can appropriately activate the shortcut function irrespective of the inclination.

In this embodiment, the shortcut function is used as one example of the predetermined actions, but the predetermined actions of the present invention are not limited to the shortcut function and are applicable to other functions. The fingerprint sensor 19 is used as one example of the operation detection unit, but the operation detection unit includes means, which can detect operations but cannot detect a fingerprint, and is applicable to other configurations.

The mobile electronic device in the present invention may be a shell type capable of opening the upper and lower housings, may be configured to allow one of the upper and lower housings to be moved to the other housing, and may be a straight type. Furthermore, the mobile electronic device in the present invention is applicable to various mobile devices, such as PDA (Personal Digital Assistant), a laptop personal computer, an electronic dictionary, etc., as well as to a mobile phone and PHS.

Although the present invention has been specified or described with reference to particular embodiments, it is obvious to one of ordinary skill in the art that various modifications or corrections may be made without departing from the scope and spirit of the present invention. This application is based on Japanese Patent Application No. 2008-301735 filed on Nov. 26, 2008, the disclosure of which is incorporated herein by reference.

INDUSTRIAL APPLICABILITY

The present invention can appropriately perform predetermined action irrespective of inclinations, and is useful for a mobile electronic device, such as a mobile phone, including an operation detection unit for detecting operations.

DESCRIPTION OF REFERENCE NUMERALS AND SIGNS

10 . . . Mobile electronic device
11 . . . Antenna
12 . . . Communication unit
13 . . . Control unit
14 . . . Storage unit
15 . . . Audio input unit
15a . . . Speaker
15b . . . Microphone
16 . . . Display unit
16a . . . Sub-display unit
17 . . . Operation unit
18 . . . Acceleration sensor
19 . . . Fingerprint sensor
101 . . . Upper housing
101B . . . Back of upper housing
101F . . . Surface of upper housing
102 . . . Lower housing
102F . . . Surface of lower housing
103 . . . Hinge
182 . . . Comb portion
183 . . . Column
184 . . . Electrode
191 . . . Protective film
193 . . . Electrode chamber
194 . . . Electrode

The invention claimed is:

1. A mobile electronic device comprising:
an operation detection unit that detects an operation;
an activation unit that performs a predetermined action;
an inclination detection unit that detects an inclination state of the operation detection unit with respect to a horizontal plane;
a control unit that makes the activation unit perform the predetermined action according to the operation detected by the operation detection unit; and
a storage unit that stores particular biometric information,
wherein the control unit changes a process of the detection in the operation detection unit according to the inclination detected by the inclination detection unit,
wherein the operation detection unit is configured to detect an operation by the movement of a subject to be detected and configured to detect the biometric information based on the operation, and
wherein the control unit is configured to make the operation detection unit change the operation detection direction by the movement of the subject to be detected according to the inclination detected by the inclination detection unit, make the activation unit perform predetermined actions based on the operation detected by the operation detection unit and a comparison between the biometric information detected based on the operation and the particular biometric information stored in the storage unit, and change the comparison method according to the inclination detected by the inclination detection unit.

2. The mobile electronic device according to claim 1, wherein the operation detection unit is configured to detect the operation and biometric information based on the operation by the movement of the subject to be detected.

3. The mobile electronic device according to claim 1, wherein the storage unit stores personal information for identifying particular individuals,
wherein the activation unit performs a first application action using the personal information stored in the storage unit or a second application action not using the personal information stored in the storage unit as the predetermined action, and
wherein the control unit uses the comparison method differently to the first and second applications.

4. The mobile electronic device according to claim 1, wherein the operation detection unit detects an operation by the movement of the subject to be detected with respect to a horizontal plane direction.

\* \* \* \* \*